(12) United States Patent
Benco et al.

(10) Patent No.: US 8,032,161 B2
(45) Date of Patent: Oct. 4, 2011

(54) USING SMS TO EXPLICITY NOTIFY CALLED PARTY WHEN CALLED PARTY BECOMES AVAILABLE

(75) Inventors: David S. Benco, Winfield, IL (US); Paresh C. Kanabar, Naperville, IL (US); John C. Nguyen, Naperville, IL (US); Huixian Song, Naperville, IL (US)

(73) Assignee: Alcatel Lucent, Paris (FR)

( * ) Notice: Subject to any disclaimer, the term of this patent is extended or adjusted under 35 U.S.C. 154(b) by 533 days.

(21) Appl. No.: 11/607,699

(22) Filed: Dec. 1, 2006

(65) Prior Publication Data
US 2008/0132255 A1 Jun. 5, 2008

(51) Int. Cl.
*H04W 4/00* (2009.01)

(52) U.S. Cl. ........ 455/466; 455/417; 455/445; 455/415; 455/446

(58) Field of Classification Search .................. 455/466, 455/417, 445, 415, 412.2
See application file for complete search history.

(56) References Cited

U.S. PATENT DOCUMENTS

| | | | |
|---|---|---|---|
| 5,758,280 A * | 5/1998 | Kimura .................. | 455/412.2 |
| 6,236,853 B1 * | 5/2001 | Mee et al. .................. | 455/414.1 |
| 6,253,075 B1 * | 6/2001 | Beghtol et al. ................ | 455/415 |
| 6,535,596 B1 * | 3/2003 | Frey et al. ................ | 379/201.01 |
| 6,826,397 B1 * | 11/2004 | Vasa .............................. | 455/417 |
| 6,882,828 B1 * | 4/2005 | Kregel ............................ | 455/70 |
| 6,999,755 B2 * | 2/2006 | Park .......................... | 455/414.1 |
| 7,043,245 B2 * | 5/2006 | Dokko .......................... | 455/445 |
| 7,349,687 B2 * | 3/2008 | Murri et al. .................. | 455/415 |
| 7,433,679 B2 * | 10/2008 | Lee et al. .................. | 455/412.1 |
| 2004/0176076 A1 * | 9/2004 | Uppuluri .................... | 455/414.1 |
| 2004/0235462 A1 * | 11/2004 | Lasken et al. ................ | 455/417 |
| 2004/0259543 A1 * | 12/2004 | Lee et al. ...................... | 455/433 |
| 2005/0047561 A1 * | 3/2005 | Seiferth ...................... | 379/88.22 |
| 2006/0246881 A1 * | 11/2006 | Winkler et al. ............... | 455/415 |
| 2007/0202895 A1 * | 8/2007 | Benco et al. .................. | 455/466 |
| 2007/0275697 A1 * | 11/2007 | Aminzadeh ................ | 455/414.1 |
| 2008/0014907 A1 * | 1/2008 | Chun ......................... | 455/414.1 |
| 2008/0139180 A1 * | 6/2008 | Mills .......................... | 455/414.1 |

* cited by examiner

*Primary Examiner* — David Q Nguyen
(74) *Attorney, Agent, or Firm* — Carmen Patti Law Group, LLC (57) ABSTRACT

A method in one example has the steps of: notifying a calling mobile terminal that a called mobile terminal is not available to receive a call; and notifying the called mobile terminal that an unsuccessful call attempt was made to the called mobile terminal via a mobile terminated short message when one of the following occurs, the called mobile terminal completes a current call and the called mobile terminal powers on.

27 Claims, 5 Drawing Sheets

USING SMS TO EXPLICITY NOTIFY CALLED PARTY WHEN CALLED PARTY BECOMES AVAILABLE

TECHNICAL FIELD

The invention relates generally to telecommunication systems and, more specifically, to wireless telecommunication systems that have SMS (Short Message Service) capability.

BACKGROUND

In current wireless implementation, when there is an unsuccessful call to a busy or powered-off mobile terminal, the called subscriber does not get any explicit indication/notification of missed call(s) after the called party (mobile terminal) transitions from busy/inactive to available. Because of this, the called party may miss some important calls while (s)he is busy or powered-off. Besides, because the calling party does not receive any indication when the called party becomes available from busy/inactive, the calling party may keep calling again and again in order to reach the called party, which is not efficient and sometimes is very fretful.

Thus, there is a need in the art for a system that provides for an improved and more efficient system for handling calls for wireless mobile terminals.

SUMMARY

One embodiment of the present method and apparatus encompasses an apparatus. This embodiment of the apparatus may comprise: a detector that detects and outputs a status of a called mobile terminal during an unsuccessful call attempt; a storage operatively coupled to the detector, the status being stored in the storage; and a monitoring module operatively coupled to the storage, the monitoring module monitoring the status of the called mobile terminal after the unsuccessful call attempt; wherein the called mobile terminal is notified for missed calls via a mobile terminated short message when one of the following occurs, the called mobile terminal completes a current call and the called mobile terminal powers on.

Another embodiment of the present method and apparatus encompasses a method. This embodiment of the method may comprise: notifying a calling mobile terminal that a called mobile terminal is not available to receive a call; and notifying the called mobile terminal that an unsuccessful call attempt was made to the called mobile terminal via a mobile terminated short message when one of the following occurs, the called mobile terminal completes a current call and the called mobile terminal powers on.

DESCRIPTION OF THE DRAWINGS

The features of the embodiments of the present method and apparatus are set forth with particularity in the appended claims. These embodiments may best be understood by reference to the following description taken in conjunction with the accompanying drawings, in the several figures of which like reference numerals identify like elements, and in which:

DETAILED DESCRIPTION

In general embodiments of the present method allow a wireless network system to explicitly notify the called party for missed calls via a mobile terminated short message when the called party completes the current call (i.e., the mobile becomes idle) or powers on. The notification to the called party indicates that calling party(ies) has/have earlier failed to call this mobile subscriber when it was busy or inactive (powered-off). Additionally with this method the system plays an announcement to the caller(s) who subscribe(s) to this service to inform that the called party is busy or inactive, and NotifyCalleD service is active for the call. This service is abbreviated below as "NCD" (Notify CalleD party).

The called party may be a wireless subscriber subscribing to SMS and NCD services; the calling party may be a wireline or wireless subscriber subscribing to NCD. In general in the following description both calling and called parties are assumed to be a wireless subscribers.

According to the embodiments of the present method and apparatus, when a mobile subscriber who has purchased this service originates a call to a mobile subscriber (the called party may or may not have subscription to NCD service), if the called mobile is busy or powered off, the caller will hear an announcement indicating that the called subscriber is busy or powered off and the NCD service is available for the call. For example, if the called party is busy, the caller may hear the following announcement: "The mobile you've called is busy at this moment, the called party will be notified via a Short Message when it becomes available". When the called mobile becomes available from busy/inactive, the system sends a mobile terminated short message explicitly to the called party, indicating that a call attempt from the calling party was made to this mobile while it was busy or inactive. After the called party receives this short message, (s)he can opt to call back the calling mobile(s).

Embodiments of the present method and apparatus do not introduce additional network elements, but instead utilize the power of a unified subscriber database such as S(D)HLR (Super Distributed Home Location register). In addition, the SMS notification is sent to the called subscriber.

A methodology of embodiments of the present method and apparatus may involve a calling mobile subscriber who has purchased the NCD service to receive a specific announcement when it calls a busy or inactive mobile subscriber and allows the called party to receive a specific short message notification for the missed call when the called subscriber becomes available from busy/inactive.

Embodiments of the present method and apparatus may have in general terms the following wireless network elements:

At least one home location register (HLR);
for calling subscriber, it supports NCD service data provisioning for the caller, i.e., the NCD service will be provisioned in calling party's HLR; passes NCD service indication to VLR MSC when a subscriber, who has purchased NCD service, is registered in the VLRMSC;
for called subscriber, it provides MSC the NCD announcement information for a NCD call; marks the record for the called subscriber (sets the NCD call flag) when it receives an incoming NCD call during busy or inactive period; notifies S-MSC to trace the called mobile's status; keeps track each time a NCD call attempt is made with calling party and called party's directory number information; notifies SMC to send a short message to the called party for each call attempt that has NCD service and reset the NCD call flag when the called party's status is changed from busy or inactive to idle.

At least one mobile switching center (MSC);
as an Incoming MSC (I-MSC), passes the calling party's NCD service information to called mobile's HLR to indicate an incoming call that has NCD service; and plays the NCD announcement (received from HLR) to the caller;

at a Serving MSC (S-MSC), it keeps track of the called mobile's status such as busy, idle, power-on or power-off; keeps track of any NCD call that is made to the mobile (sets NCD call flag in called mobile's VLR); and reports the status to its HLR when it becomes idle (from busy state); and resets NCD flag in VLR after a status change is sent to HLR;

A short message center (SMC);
that sends a short message to the called party subscribing to NCD, indicating a call attempt was made while the called party was busy or inactive after SMC receives a notification from the HLR. For example, if there are 3 calling parties subscribing to NCD and who had earlier unsuccessfully called the mobile, 3 short messages will be sent to (the now available) called party, one corresponding to each calling party that had earlier tried to call the called party.

Figure 1:
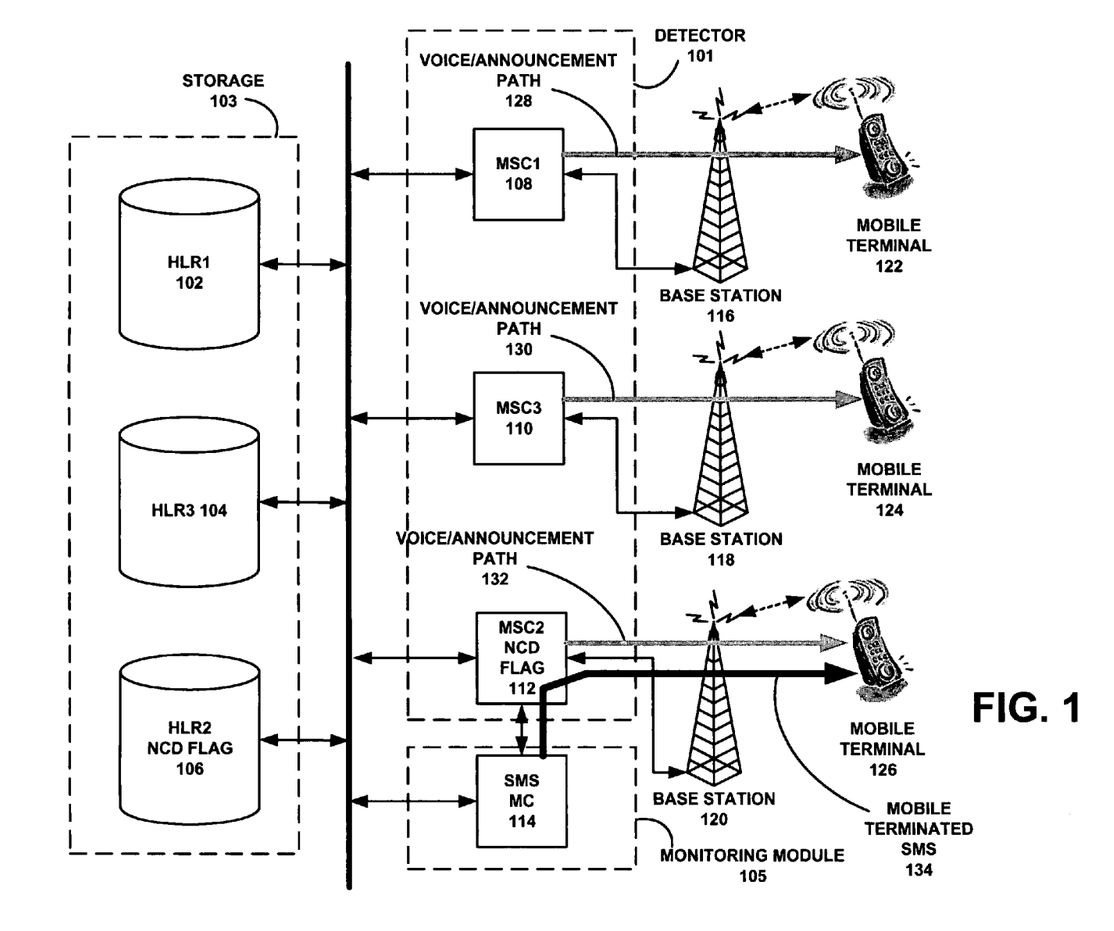
FIG. 1 depicts an embodiment according to the present apparatus.

As depicted in FIG. 1 an embodiment of the present method and apparatus may have: a detector 101 that detects and outputs a status of a called mobile terminal during an unsuccessful call attempt; a storage 103 operatively coupled to the detector 101, the status being stored in the storage 103; and a monitoring module 105 operatively coupled to the storage 103, the monitoring module 105 monitoring the status of the called mobile terminal after the unsuccessful call attempt. The called mobile terminal may be notified for missed calls via a mobile terminated short message when one of the following occurs, the called mobile terminal completes a current call and the called mobile terminal powers on. The status of the called mobile terminal may be stored for a busy condition, for a powered-off condition and/or for a No Page Response condition.

In the FIG. 1 embodiment a plurality of home location registers HLR1 (102), HLR3 (104), HLR2 (NCD Flag) (106) may be operatively coupled to a plurality of mobile switching centers MSC1 (108), MSC3 (110), MSC2 (NCD Flag) (112), SMS MC (Message Center) (114). Each mobile switching center MSC1 (108), MSC3 (110), MSC2 (NCD Flag) (112) may be operatively coupled to a respective mobile terminal 122, 124, 126 via respective base station 116, 118, 120.

In addition, the mobile switching center 108 may communicate announcements to the mobile terminal 122 along voice/announcement path 128. Similarly, the mobile switching center 110 may communicate announcements to the mobile terminal 124 along voice/announcement path 130. Furthermore, the mobile switching center 112 may communicate announcements to the mobile terminal 126 along voice/announcement path 132. The SMS MC 114 may send a mobile terminated SMS 134 to the mobile terminal 126 via the mobile switching center 112.

Figure 2A:
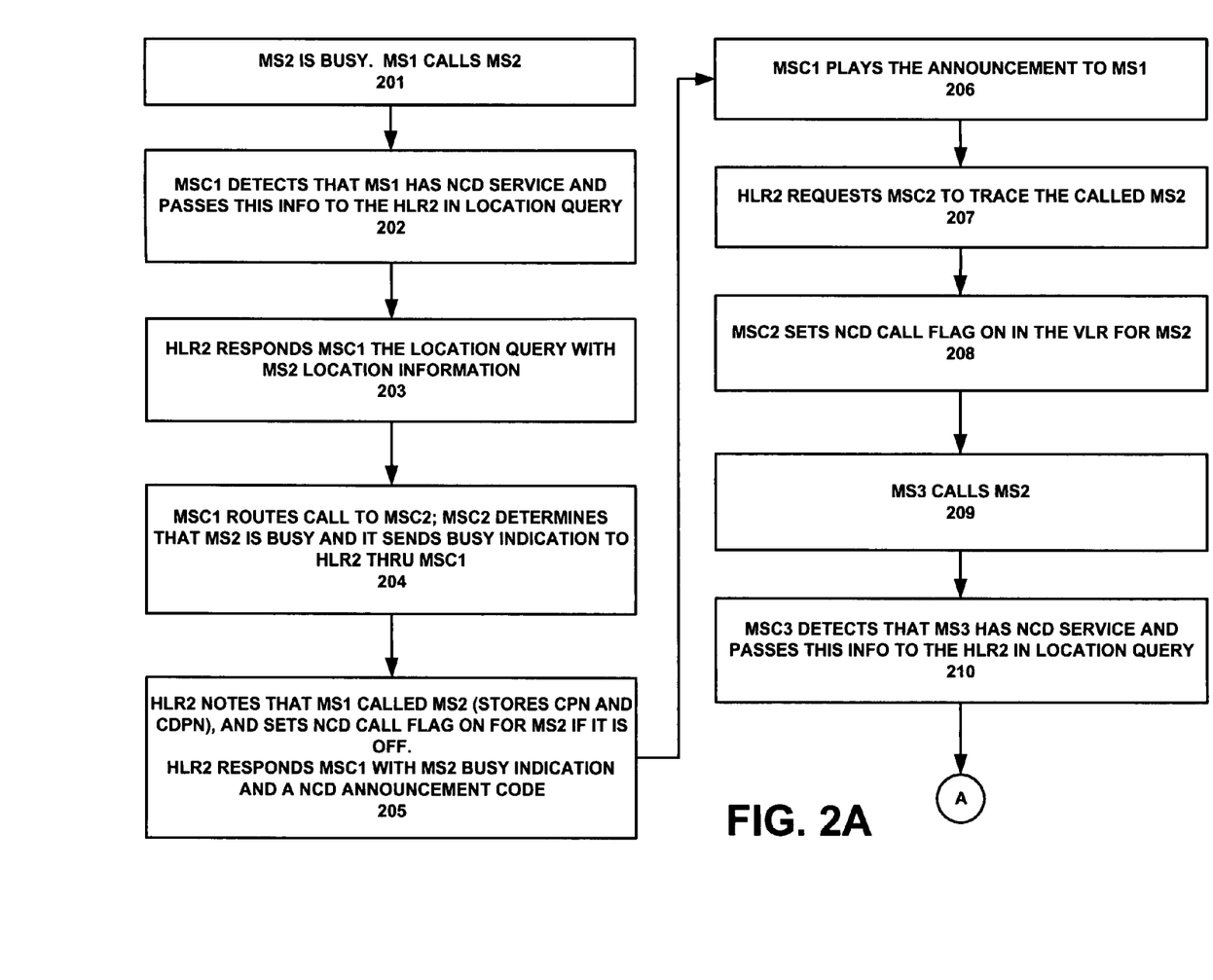
FIGS. 2A and 2B depict an embodiment of the present method for SMS notification to a called party, when the called party becomes available from busy.
Figure 2B:
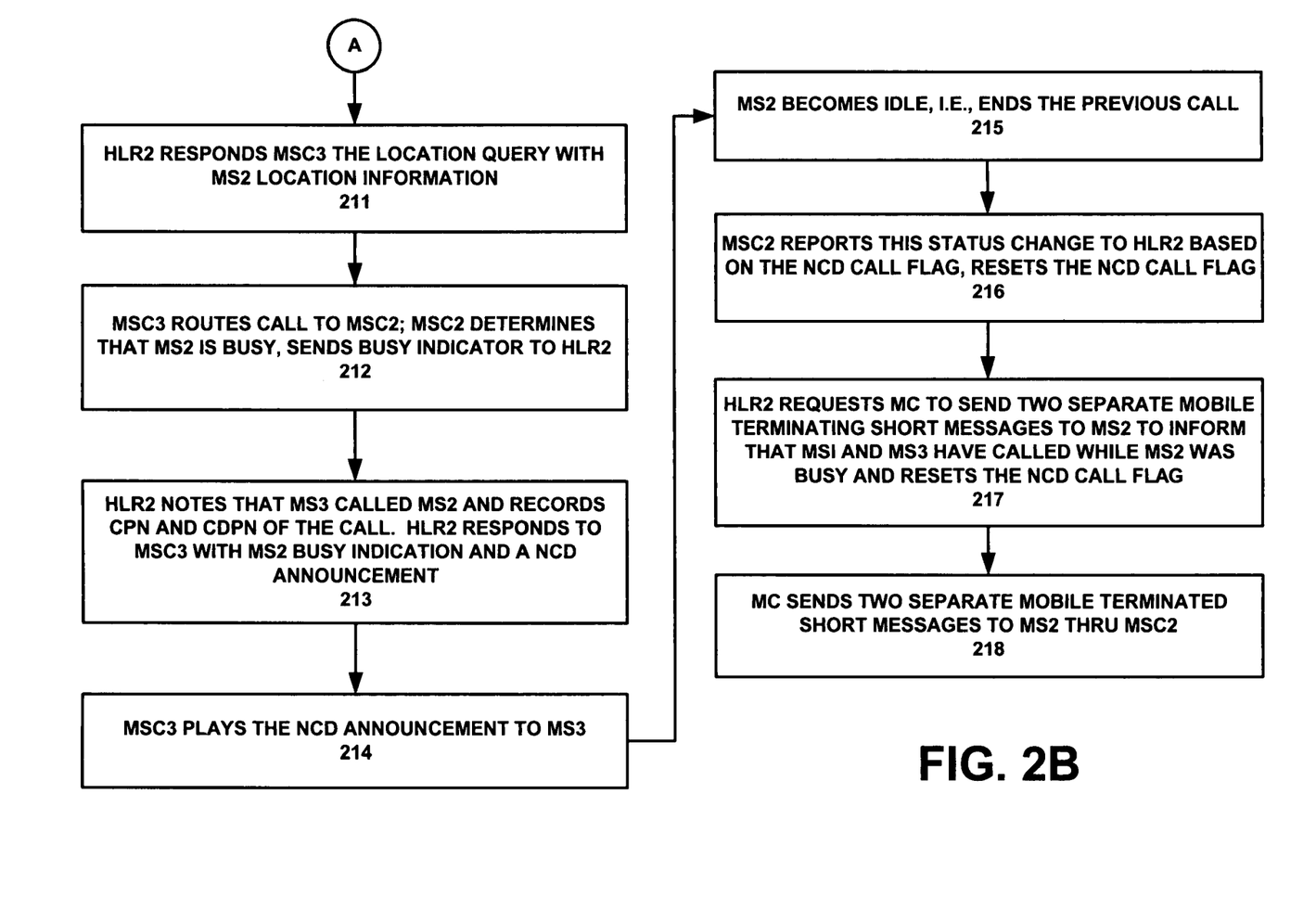

FIGS. 2A and 2B depict an embodiment of the present method for SMS notification to a called party, when the called party becomes available from busy. This embodiment may have the following steps (note; MS1, MS2, and MS3's HLR is HLR1, HLR2, and HLR3 respectively, and the serving MSC for MS1, MS2, and MS3 is MSC1, MSC2, and MSC3 respectively.):

1. MS2 is busy. MS1 calls MS2 (201).
2. MSC1 detects that MS1 has NCD service and passes this info to the HLR2 in location query (202).
3. HLR2 responds MSC1 the location query with MS2 location information (203).
4. MSC1 routes call to MSC2; MSC2 determines that MS2 is busy and it sends busy indication to HLR2 thru MSC1, e.g, in TransferToNumber message of termination trigger for Busy operation in ANSI 41 standard (204).
5. HLR2 notes that MS1 called MS2 (stores CPN and CDPN), and sets NCD call flag on for MS2 if it is off. HLR2 responds MSC1 with MS2 Busy indication and a NCD announcement code (205).
6. MSC1 plays the announcement to MS 1, such as "The called MS2 is busy, a Short Message Notification will be sent to the called party for this missed call when it becomes idle" (206).
7. HLR2 requests MSC2 to trace the called MS2 (i.e., Report idle state) (207).
8. MSC2 sets NCD call flag on in the VLR for MS2 (208).
9. MS3 calls MS2 (209).
10. MSC3 detects that MS3 has NCD service and passes this info to the HLR2 in location query (210).
11. HLR2 responds MSC3 the location query with MS2 location information (211).
12. MSC3 routes call to MSC2; MSC2 determines that MS2 is busy, sends busy indicator to HLR2 (212).
13. HLR2 notes that MS3 called MS2 (no change on NCD call flag for MS2 because it is set already in step 5) and records CPN and CDPN of the call. HLR2 responds to MSC3 with MS2 Busy indication and a NCD announcement (213).
14. MSC3 plays the NCD announcement to MS3. Note: HLR2 does not need to send another request to MSC2 for MS2 status tracing (see step 7) (214).
15. MS2 becomes idle, i.e, ends the previous call (215).
16. MSC2 reports this status change to HLR2 based on the NCD call flag, resets the NCD call flag (216).
17. HLR2 requests MC to send two separate Mobile Terminating Short Messages to MS2 to inform that MS1 and MS3 have called while MS2 was busy and resets the NCD call flag (217).
18. MC sends two separate Mobile Terminated Short Messages to MS2 thru MSC2 (218).

Figure 3A:
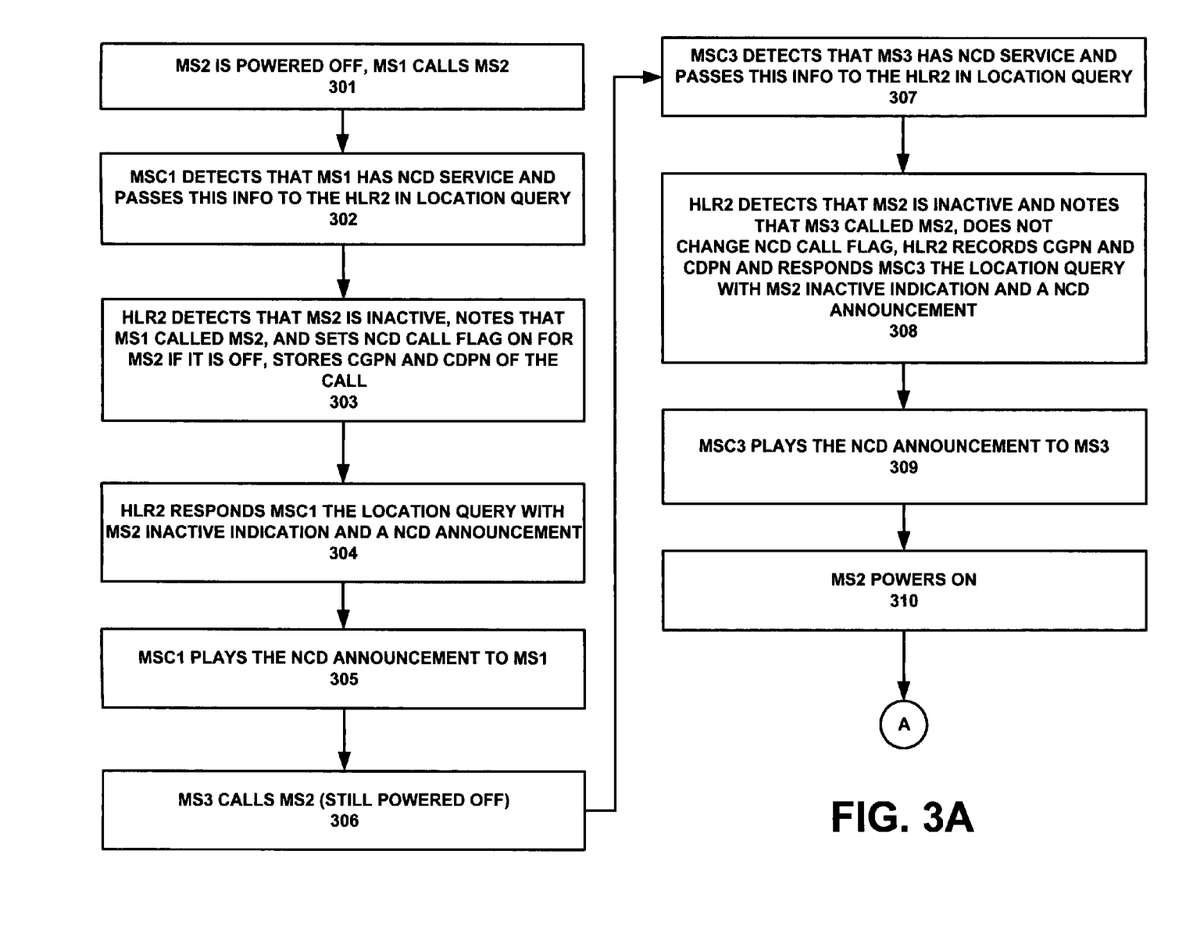
FIGS. 3A and 3B depict an embodiment of the present method for SMS notification to a called party, when the called party becomes active.
Figure 3B:
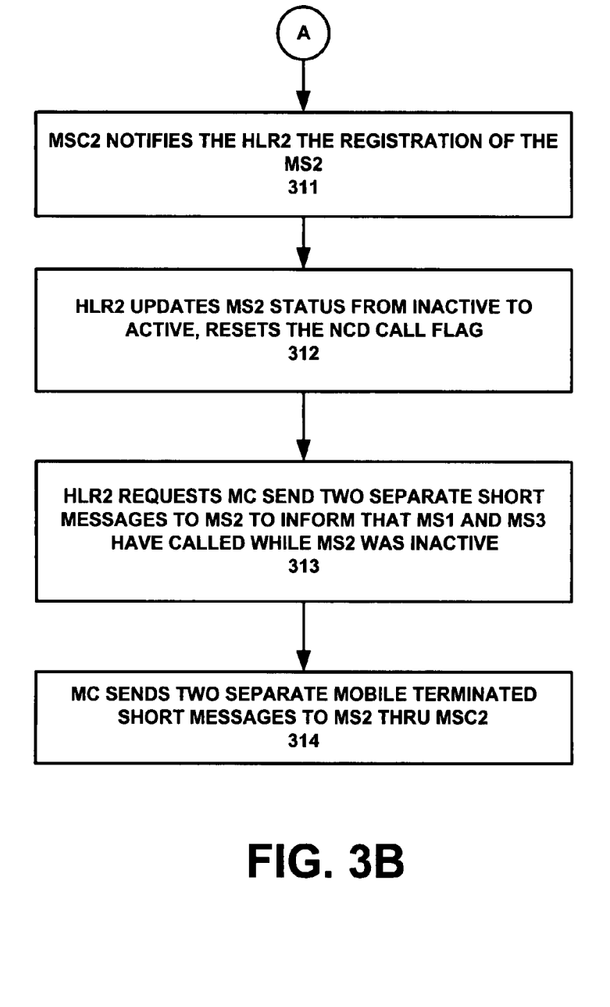

FIGS. 3A and 3B depict an embodiment of the present method for SMS notification to a called party, when the called party becomes active. This embodiment may have the following steps:

1. MS2 is powered off, MS1 calls MS2 (301).
2. MSC1 detects that MS1 has NCD service and passes this info to the HLR2 in location query (302).
3. HLR2 detects that MS2 is inactive, notes that MS1 called MS2, and sets NCD call flag on for MS2 if it is off, stores CGPN (CallinG Party Number) and CDPN (CalleD Party Number) of the call (303).
4. HLR2 responds MSC1 the location query with MS2 inactive indication and a NCD announcement (304).
5. MSC1 plays the NCD announcement to MS1, such as "The called MS2 is inactive, a Short Message Notification will be sent to MS2 for the missed call when it becomes available" (305).
6. MS3 calls MS2 (still powered off) (306).
7. MSC3 detects that MS3 has NCD service and passes this info to the HLR2 in location query (307).
8. HLR2 detects that MS2 is inactive and notes that MS3 called MS2, does not change NCD call flag because it is set already in step 3, HLR2 records CGPN and CDPN and responds MSC3 the location query with MS2 inactive indication and a NCD announcement (308).

9. MSC3 plays the NCD announcement to MS3 (309).
10. MS2 powers on (310).
11. MSC2 notifies the HLR2 the registration of the MS2 (311).
12. HLR2 updates MS2 status from inactive to active, resets the NCD call flag (312).
13. HLR2 requests MC send two separate Short Messages to MS2 to inform that MS1 and MS3 have called while MS2 was inactive (313).
14. MC sends two separate Mobile Terminated Short Messages to MS2 thru MSC2 (314).

The present apparatus in one example may comprise a plurality of components such as one or more of electronic components, hardware components, and computer software components. A number of such components may be combined or divided in the apparatus.

The present apparatus may employ at least one computer-readable signal-bearing media that may store software, firmware and/or assembly language, etc. The computer-readable signal-bearing medium may comprise magnetic, electrical, optical, biological, and/or atomic data storage mediums. For example, the computer-readable signal-bearing medium may comprise floppy disks, magnetic tapes, CD-ROMs, DVD-ROMs, hard disk drives, and electronic memories, etc. The computer-readable signal-bearing medium may also comprise a modulated carrier signal transmitted over a network comprising or coupled with the apparatus, for instance, at least one of a telephone network, a local area network ("LAN"), a wide area network ("WAN"), the Internet, and a wireless network.

The present method and apparatus are not limited to the particular details of the depicted embodiments and other modifications and applications are contemplated. Certain other changes may be made in the above-described embodiments without departing from the true spirit and scope of the present method and apparatus herein involved. It is intended, therefore, that the subject matter in the above depiction shall be interpreted as illustrative and not in a limiting sense.

We claim:

1. A method, comprising:
   notifying, via utilization of a unified subscriber database without introduction of additional network elements, a calling mobile terminal (calling subscriber terminal) that a called mobile terminal (called subscriber terminal) is not available to receive a call, the called mobile terminal being a wireless subscriber subscribing to SMS (Short Message Service) and NCD (Notify CalleD party) services, and the calling mobile terminal being one of a wire-line or wireless subscriber subscribing to NCD;
   setting a flag in the unified subscriber database in response to the call to indicate that the calling mobile terminal subscribes to NCD;
   requesting a trace of the called mobile terminal to monitor when it becomes available to receive a call;
   receiving a status change message based on the flag set in the unified subscriber database; and
   providing a short message notification to the called subscriber terminal for a missed call in response to the status change message.

2. The method according to claim 1, wherein the notification to the calling mobile terminal consists of an announcement indicating unavailability of the called mobile terminal.

3. The method according to claim 2, wherein the announcement additionally contains a specific reason for the unavailability of the called mobile terminal.

4. The method according to claim 2, wherein the announcement additionally contains a telephone number of the called mobile terminal.

5. The method according to claim 2, wherein the announcement contains a time that the called mobile terminal was most recently available.

6. The method according to claim 1, wherein the called mobile terminal receives an SMS (Short Message Service) message indicating that an unsuccessful call attempt was made to the called mobile terminal.

7. The method according to claim 6, wherein the called mobile terminal receives an SMS message indicating that an unsuccessful call attempt was made to the called mobile terminal by a specific calling mobile terminal telephone number.

8. The method according to claim 6, wherein the called mobile terminal receives an SMS message indicating that an unsuccessful call attempt was made to the called mobile terminal at a specific time.

9. The method according to claim 6, wherein the called mobile terminal receives several SMS messages indicating that unsuccessful call attempts were made to the called mobile terminal.

10. The method according to claim 6, wherein the called mobile terminal receives a plurality of respective SMS messages for a plurality of call attempts, a respective SMS messages indicating that a respective call attempt was unsuccessfully made to the called mobile terminal.

11. The method according to claim 10, wherein the called mobile terminal receives the plurality of SMS messages ordered by time of unsuccessful call attempt.

12. The method according to claim 10, wherein the called mobile terminal receives the plurality of SMS messages grouped by calling mobile terminal telephone number.

13. The method according to claim 1, wherein the method further comprises:
   SMS (Short Message Service) notification to a called mobile terminal, also referred to as a mobile station (MS) when the called mobile terminal becomes available from a busy state involving the steps of:
   a MS1 calling a MS2, the MS2 being busy;
   a MSC1 (mobile switching center) detecting that MS1 has an NCD (Notify CalleD party) service and passes information indicative thereof to an HLR2 (Home Location Register) in a location query;
   the HLR2 responding to the MSC1 location query with MS2 location information;
   the MSC1 routing a call to a MSC2;
   the MSC2 determining that the MS2 is busy and sending a busy indication to the HLR2 thru the MSC1, HLR2 noting that MS1 called MS2 (stores CPN and CDPN), and sets NCD call flag on for MS2 if it is off, and HLR2 responding MSC1 with MS2 Busy indication and a NCD announcement code;
   MSC1 playing an announcement to MS1;
   HLR2 requesting MSC2 to trace the called MS2;
   MSC2 setting NCD call flag on in a VLR (visitor location register) for MS2;
   MS3 calling MS2;
   MSC3 detecting that MS3 has NCD service and passes this info to the HLR2 in location query;
   HLR2 responding MSC3 the location query with MS2 location information;

MSC3 routing call to MSC2, the MSC2 determining that MS2 is busy, and sending busy indicator to HLR2;

HLR2 noting that MS3 called MS2 and recording CPN and CDPN of the call, the HLR2 responding to MSC3 with MS2 Busy indication and a NCD announcement;

MSC3 playing the NCD announcement to MS3;

MS2 becoming idle;

MSC2 reporting this status change to HLR2 based on the NCD call flag, and resetting the NCD call flag;

HLR2 requesting MC (Message Center) to send two separate Mobile Terminating Short Messages to MS2 to inform that MS1 and MS3 have called while MS2 was busy and resetting the NCD call flag; and MC sending two separate Mobile Terminated Short Messages to MS2 thru MSC2.

14. The method according to claim 1, wherein the method further comprises:

SMS notification to a called mobile terminal (MS) when the called mobile terminal becomes active involving the steps of:

MS2 powering off, and MS1 calling MS2;

MSC1 detecting that MS1 has NCD service and passing information indicative thereof to an HLR2 in a location query;

HLR2 detecting that MS2 is inactive, noting that MS1 called MS2, and setting NCD call flag on for MS2 if it is off, and storing CGPN (CallinG Party Number) and CDPN (CalleD Party Number) of the call;

HLR2 responding MSC1 the location query with MS2 inactive indication and a NCD announcement;

MSC1 playing the NCD announcement to MS1;

MS3 calling MS2 (still powered off);

MSC3 detecting that MS3 has NCD service and passing information thereof to the HLR2 in a location query;

HLR2, detecting that MS2 is inactive and noting that MS3 called MS2, not changing NCD call flag, HLR2 recording CGPN and CDPN and responding MSC3 the location query with MS2 inactive indication and a NCD announcement;

MSC3 playing the NCD announcement to MS3;

MS2 powering on;

MSC2 notifying the HLR2 about registration of the MS2;

HLR2 updating MS2 status from inactive to active, and resetting the NCD call flag;

HLR2 requesting MC to send two separate Short Messages to MS2 to inform that MS1 and MS3 have called while MS2 was inactive; and MC sending two separate Mobile Terminated Short Messages to MS2 thru MSC2.

15. A method, comprising:

detecting the status of a called mobile terminal during an unsuccessful call attempt by a calling terminal, the called mobile terminal being a wireless subscriber subscribing to SMS (Short Message Service) and NCD (Notify CalleD party) services, and the calling mobile terminal being one of a wire-line or wireless subscriber subscribing to NCD;

notifying, via utilization of a unified subscriber database without introduction of additional network elements, the calling mobile terminal (calling subscriber terminal) of the status of the called mobile terminal (called subscriber terminal)

setting an NCD call flag for the called subscriber terminal when the calling mobile terminal places an NCD call during busy or inactive period of the called subscriber terminal;

storing a status of the called subscriber terminal;

sending a short message to the called subscriber terminal, indicating a call attempt was made, when one of the following occurs, the called mobile terminal completes a call and the called mobile terminal powers on.

16. The method according to claim 15, wherein the status of the called mobile terminal is stored for a busy condition.

17. The method according to claim 15, wherein the status of the called mobile terminal is stored for a powered-off condition.

18. The method according to claim 15, wherein the status of the called mobile terminal is stored for a No Page Response condition.

19. The method according to claim 15, wherein the status of the called mobile terminal is monitored until the called mobile terminal becomes available when the called mobile terminal originates a call.

20. The method according to claim 15, wherein the status of the called mobile terminal is monitored until the called mobile terminal becomes available by receiving a predetermined level of signal strength to permit the mobile terminal to perform a successful registration.

21. The method according to claim 15, wherein the status of the called mobile terminal is monitored until the called mobile terminal becomes available by receiving one of an incoming call and an incoming SMS (Short Message Service) message.

22. The method according to claim 15, wherein the status of the called mobile terminal is monitored only if the mobile terminal is marked as authorized in a subscriber database.

23. An apparatus, comprising:

at least one of, a home location register (HLR), which for a calling subscriber terminal, supports NotifyCalleD service (NCD) data provisioning for the calling subscriber terminal and effects an announcement at the calling subscriber terminal when a called subscriber terminal is busy or inactive: and for a called subscriber terminal, providing a short message notification to the called subscriber terminal for a missed call when the called subscriber terminal becomes available from busy/inactive;

a mobile switching center (MSC) which, as an Incoming MSC (I-MSC), passes NCD service information of the calling subscriber terminal to an HLR to indicate an incoming call of the called subscriber terminal that has NCD service; and plays an announcement to the calling subscriber terminal;

as a Serving MSC (S-MSC), keeps track of the status of the called subscriber terminal, the status being at least one of busy, idle, power-on or power-off; keeps track of any NCD call that is made to the called subscriber terminal; and reports the status of the called subscriber terminal to the HLR of the calling subscriber terminal when the called subscriber terminal becomes idle.

24. The apparatus according to claim 23, wherein the status of the called mobile terminal is stored for a busy condition.

25. The apparatus according to claim 23, wherein the status of the called mobile terminal is stored for a powered-off condition.

26. The apparatus according to claim 23, wherein the status of the called mobile terminal is stored for a No Page Response condition.

27. An apparatus, comprising:

at least one of, a home location register (HLR), which for a calling subscriber terminal, supports NotifyCalleD service (NCD) data provisioning for the calling subscriber terminal, and for a called subscriber terminal, provides a respective mobile switching center (MSC) with NCD announcement information, sets an NCD call flag for the called subscriber terminal when the HLR receives an incoming NCD call during busy or inactive period of the called subscriber terminal; effects tracing of a status of the called subscriber terminal; keeps track each time an NCD call attempt is made with directory number information of the calling subscriber terminal and the called subscriber terminal; notifies a short message center (SMC) to send a short message to the called subscriber terminal for each call attempt that has NCD service and resets the NCD call flag when the status of the called subscriber terminal is changed from busy or inactive to idle, the SMC sending a short message to the called subscriber terminal, indicating a call attempt was made while the called subscriber terminal was busy or inactive after the SMC receives a notification from the HLR;

a mobile switching center (MSC) which, as an Incoming MSC (I-MSC), passes NCD service information of the calling subscriber terminal to an HLR to indicate an incoming call of the called subscriber terminal that has NCD service; and plays the NCD announcement to the calling subscriber terminal;

as a Serving MSC (S-MSC), keeps track of the status of the called subscriber terminal, the status being at least one of busy, idle, power-on or power-off; keeps track of any NCD call that is made to the called subscriber terminal; and reports the status of the called subscriber terminal to the HLR of the calling subscriber terminal when the called subscriber terminal becomes idle.

* * * * *